United States Patent
Suzuki et al.

(10) Patent No.: US 7,768,699 B2
(45) Date of Patent: Aug. 3, 2010

(54) LASER PHASE DIFFERENCE DETECTING DEVICE AND LASER PHASE CONTROL DEVICE

(75) Inventors: Jiro Suzuki, Tokyo (JP); Yoshihito Hirano, Tokyo (JP); Yutaka Ezaki, Tokyo (JP); Yasushi Horiuchi, Tokyo (JP); Masaki Tabata, Tokyo (JP); Kouji Namura, Tokyo (JP); Izumi Mikami, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 323 days.

(21) Appl. No.: 11/658,315

(22) PCT Filed: Aug. 20, 2004

(86) PCT No.: PCT/JP2004/012012
§ 371 (c)(1),
(2), (4) Date: Jan. 24, 2007

(87) PCT Pub. No.: WO2006/018897
PCT Pub. Date: Feb. 23, 2006

(65) Prior Publication Data
US 2008/0304139 A1      Dec. 11, 2008

(51) Int. Cl.
*H01S 3/00* (2006.01)
*G02B 5/28* (2006.01)
*G01B 9/02* (2006.01)

(52) U.S. Cl. .................. 359/337.22; 359/583; 356/455
(58) Field of Classification Search .................. 359/349, 359/583; 356/455
See application file for complete search history.

(56) References Cited

U.S. PATENT DOCUMENTS

| 4,798,437 A | * | 1/1989 | Rediker et al. ................. 385/3 |
| 6,219,360 B1 | | 4/2001 | Komine |
| 6,366,356 B1 | | 4/2002 | Brosnan et al. |

FOREIGN PATENT DOCUMENTS

| JP | 03216530 A | * | 9/1991 |
| JP | 11-340555 A | | 12/1999 |
| JP | 2000-56280 A | | 2/2000 |
| JP | 2000-323774 A | | 11/2000 |
| JP | 2003-130609 A | | 5/2003 |

* cited by examiner

*Primary Examiner*—Eric Bolda
(74) *Attorney, Agent, or Firm*—Birch, Stewart, Kolasch & Birch, LLP.

(57) ABSTRACT

A phase difference detecting device includes a splitter for splitting laser beams into a first group which will travel along a first path and a second group which will travel along a second path, a beam selection/extraction unit for selecting, as reference light, one beam from the first group to allow it to pass therethrough, a path length changing unit for changing the length of the first path, a combining unit for combining the reference light and beams which construct the second group to produce interference light, and a detector for detecting the intensity of the interference light. The device changes the length of the first path using the path length changing unit to detect a path length which maximizes the intensity of the interference light for each of the beams which construct the second group, and determines a phase difference among the beams from the detected path length.

8 Claims, 6 Drawing Sheets

LASER PHASE DIFFERENCE DETECTING DEVICE AND LASER PHASE CONTROL DEVICE

FIELD OF THE INVENTION

The present invention relates to a laser phase difference detecting device and a laser phase control device.

BACKGROUND OF THE INVENTION

It is known that a laser device in which high power is essential generally uses a method of acquiring desired light intensity by focusing a plurality of laser beams onto a target simultaneously. Such a laser device divides or splits a laser beam emitted out of one master oscillator into a plurality of laser beams, amplifies them respectively, and focuses the amplified plurality of laser beams which are arranged as if they are bundled (referred to as the main output beam) onto a small target at a long distance in order to centralize the energy onto the target. Thus, a technology for focusing laser beams (this technology is called coherent coupling) to acquire an output beam equivalent to a single laser beam having a large diameter from a bundle of a plurality of laser beams has been studied.

In order to implement the coherent coupling, it is necessary to carry out control of the phases of the individual laser beams which construct the main output beam so that the equiphase wave surfaces of the electromagnetic waves of the plurality of laser beams can be assumed to be one wave surface. For this reason, a laser phase difference detecting device for detecting a relative phase difference among the phases of the individual laser beams is needed.

A wave front sensor as shown in FIG. 5 of patent reference 1 is an example of such a laser phase difference detecting device, and uses, as reference light, light into which it splits a part of a plurality of laser beams emitted out of a master oscillator which is a source for generating the plurality of laser beams using a beam splitter, and observes the intensity of interference between the reference light and the main output beam and detects the relative phase difference among the phases of the individual laser beams.

[Patent reference 1] JP,11-340555,A (see FIG. 5)

A problem with the prior art laser phase difference detecting device constructed as mentioned above is that because it needs to extract a part of the light emitted out of the master oscillator and to use it as the reference light, the device needs to make the reference light travel a long distance in a case in which the distance between a position where it generates the main output beam and the master oscillator is large, and therefore the device is enlarged and the manufacturing cost of the device increases.

Furthermore, when time fluctuations in the optical path length occur in the optical path in which the reference light is made to propagate due to atmospheric density change, vibrations, etc., the time fluctuations in the optical path length have an influence on the detection of the phase difference. Another problem is therefore that in this case, because the time fluctuation components in the length of the optical path of the reference light must also be taken into consideration and corrected in order to correct for the phase difference using the detected phase difference, the amount of calculations for the correction may increase and the system may not be stabilized. A further problem is that there is a necessity to additionally provide a means for detecting the time fluctuation components of the length of the optical path of the reference light to make a correction to the time fluctuation components, and therefore the manufacturing cost of the device increases.

A still further problem is that in a case of applying the prior art laser phase difference detecting device to coherent coupling used for generating a main output beam having a short coherence length of the order of about several 10 micrometers, like a super-short pulse laser beam, because the reference light and the main output beam interfere each other and an allowable range of an optical path length difference is small, it takes much time and effort to make an adjustment to the coherent coupling.

The present invention is made in order to solve the above-mentioned problems, and it is therefore an object of the present invention to provide a small-size, low-cost, and easy-to-use laser phase difference detecting device.

It is another object of the present invention to provide a laser phase control device using the laser phase difference detecting device.

DISCLOSURE OF THE INVENTION

In accordance with the present invention, there is provided a laser phase difference detecting device including: an optical path dividing unit for dividing individual laser beams which construct a laser beam group into a first laser beam group which will travel along a first optical path and a second laser beam group which will travel along a second optical path; a beam selection/extraction unit for selecting, as reference light, one laser beam from the first laser beam group so as to allow the selected laser beam to pass therethrough; an optical path length changing unit for changing an optical path length of the first optical path; an optical path combining unit for combining the reference light and individual laser beams which construct the second laser beam group so as to produce interference light; and a light detector for detecting an intensity of the interference light. The laser phase difference detecting device changes the optical path length of the first optical path using the optical path length changing unit so as to detect an optical path length which maximizes the intensity of the interference light for each of the laser beams which construct the second laser beam group, and determines a phase difference among the phases of the individual laser beams on a basis of the detected optical path length.

As a result, compared with prior art apparatus, the laser phase difference detecting device can be downsized and the cost of the laser phase difference detecting device can be reduced.

PREFERRED EMBODIMENTS OF THE INVENTION

In order to explain the invention in greater detail, the preferred embodiments of the invention will be explained below with reference to the accompanying figures.

Embodiment 1

Figure 1:
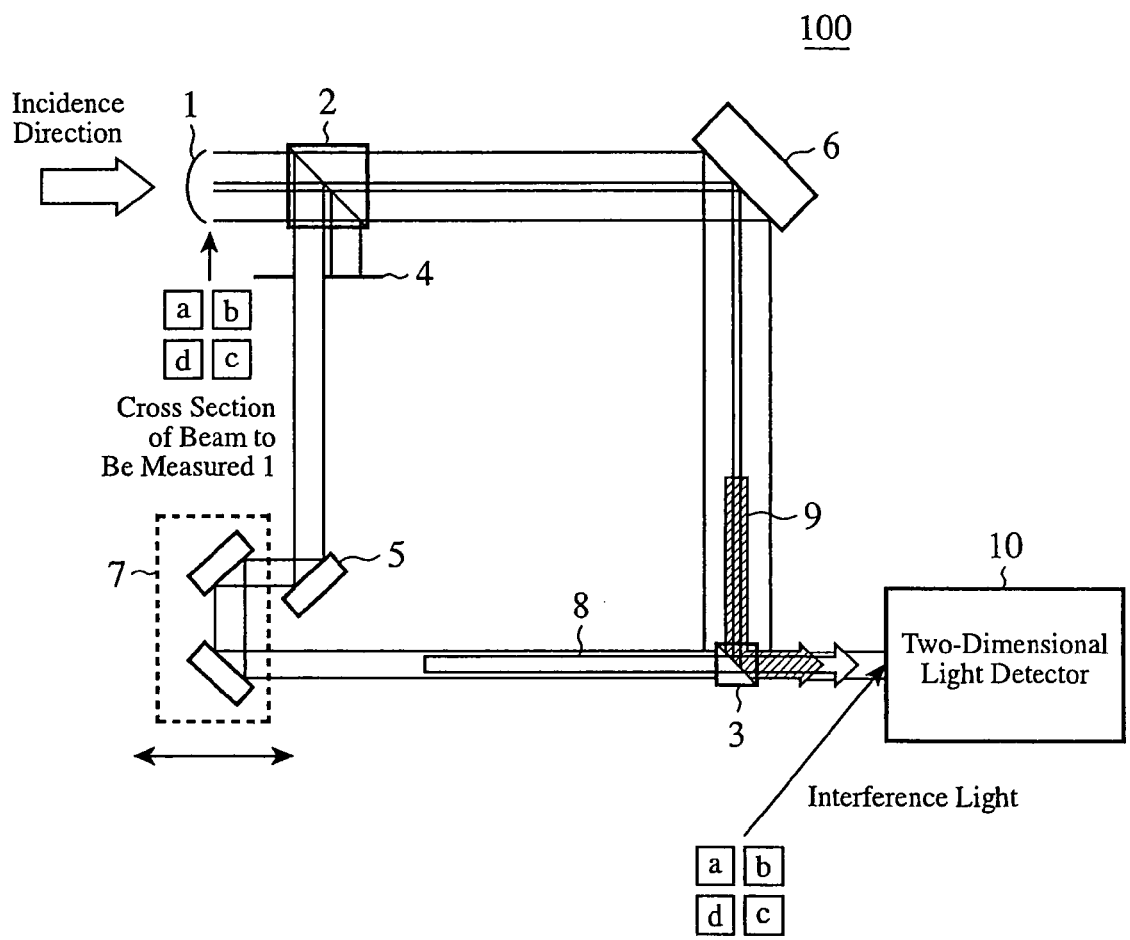
FIG. 1 is a diagram showing the structure of a laser phase difference detecting device in accordance with embodiment 1 of the present invention.

FIG. 1 is a diagram showing the structure of a laser phase difference detecting device 100 in accordance with embodiment 1 of the present invention. As shown in the figure, the laser phase difference detecting device 100 is provided with a beam splitter (an optical path dividing unit) 2, a beam splitter (an optical path combining unit) 3, a beam selection/extraction unit 4, a reflecting mirror 5, a reflecting mirror 6, an optical path length changing unit 7, and a two-dimensional light detector (light detector) 10. The laser phase difference detecting device 100 is an application of a general Mach-Zehnder interferometer.

Next, the operation of the laser phase difference detecting device in accordance with this embodiment of the present invention will be explained.

A part of a laser beam emitted out of a laser oscillator is split and extracted by a splitting/extracting means (not shown), and the beam diameter of the part of the laser beam is expanded or reduced by a scaling means (not shown) if necessary. This extracted part of the laser beam is defined as a beam to be measured (i.e., a laser beam group or main output beam) 1. The beam to be measured 1 is the one in which two or more split laser beams are so arranged that they are bundled. Hereafter, assume that, as shown in FIG. 1, the beam to be measured is a bundle of four rectangular cross-section beams (a, b, c, d) which are arranged in the form of the kanji character "田."

The beam splitter 2 amplitude-splits the beam to be measured 1 into a reflected component (i.e., a first laser beam group) which will travel toward a downward direction shown in FIG. 1 (i.e., along a first optical path), and a transmitted component (i.e., a second laser beam group) which will travel toward a rightward direction shown in FIG. 1 (i.e., along a second optical path). The transmitted component of the beam to be measured 1 is reflected by the reflecting mirror 6 so that its traveling direction is changed by 90 degrees, and then arrives at the beam splitter 3 as light to be measured 9.

Only the beam a is selectively extracted from the reflected component of the beam to be measured 1 and is allowed to propagate by the beam selection/extraction unit 4, while the beams b, c, and d are intercepted. After the beam a selected and extracted by the beam selection/extraction unit 4 is reflected by the reflecting mirror 5 so that its traveling direction is changed by 90 degrees, its traveling direction is further changed by the optical path length changing unit 7 and the extracted beam a arrives at the beam splitter 3 as reference light 8.

The optical path length changing unit 7 has a function of returning a beam incident thereupon toward a direction which is very close to the incidence direction of the beam incident upon the laser phase difference detecting device. The provision of the optical path length changing unit 7 can change the length of the optical path along which the transmitted component of the beam to be measured 1 travels from the beam splitter 2 to the beam splitter 3, and the length of the optical path along which the reflected component travels from the beam splitter 2 to the beam splitter 3. According to embodiment 1, the optical path length changing unit 7 can consist of a position-adjustable Littrow reflector.

Interference occurs when the reference light 8 and the light to be measured 9 are combined by the beam splitter 3. The interference light is incident upon the two-dimensional light detector 10, and the intensity of the interference light is converted into an electric signal by the two-dimensional light detector.

Next, a basic operation of detecting a relative phase difference among the phases of the beams a, b, c, and d which construct the beam to be measured 1 will be explained.

The intensity of the interference light observed by the two-dimensional light detector 10 is given by the following equation (1):

$$I = a1^2 + a2^2 + 2a1 \cdot a2 \cos(\theta 1 - \theta 2) \quad (1)$$

where I is the intensity of the interference light, a1 is the amplitude of the reference light 8, a2 is the amplitude of the light to be measured 9, $\theta 1$ is the phase of the reference light 8, and $\theta 2$ is the phase of the light to be measured 9.

As shown in the equation (1), the intensity I of the interference light varies sinusoidally depending on the phase difference $(\theta 1 - \theta 2)$ between the phases of the reference light 8 and the light to be measured 9. When $(\theta 1 - \theta 2)$ is 0, the intensity I of the interference light reaches its maximum. The laser phase difference detecting device scans the length of the optical path of the reference light 8 in steps of one wavelength or less using the optical path length changing unit 7 so as to detect an optical path length who maximizes the intensity of the interference light for each of the beams a, b, c, and d. In a case in which this optical path length which maximizes the intensity of the interference light differs among the beams a, b, c, and d, the laser phase difference detecting device can recognize that the phases of the beams are shifted from one another, and therefore the phase difference among the phases of the beams from the optical path length difference which maximizes the intensity of the interference light intensity for the beams, respectively.

As mentioned above, in accordance with the present invention, because a part of the beam to be measured 1 is used as the reference light 8, it is not necessary to extract any reference light from the laser master oscillator separately, and to introduce it into the laser phase difference detecting device 100. Therefore, compared with prior art apparatus, the laser phase difference detecting device can be downsized and the cost of the laser phase difference detecting device can be reduced.

Furthermore, because the optical path lengths of the reference light 8 and light to be measured 9 can be changed using the optical path length changing unit 7, the optical path along which the interference light travels can be accommodated in the apparatus. In addition, the lengths of the optical paths along which the two beams into which the incident light is split by the beam splitter 2 travels up to the beam splitter 2 are short, and therefore fluctuations in the optical path lengths can be reduced.

Furthermore, because the optical path along which the interference light travels is accommodated in the apparatus, it is relatively easy to make the optical path length of the reference light equal to that of the light to be measured with a desired degree of precision even if the beam to be measured 1 has a short coherence length, like pulse laser light.

Thus, the laser phase difference detecting device can be downsized and the portability of the laser phase difference detecting device can be improved. In addition, adjustments for the measurement can be made easily.

In this embodiment 1, the laser phase difference detecting device 100 is an application of a Mach-Zehnder interferometer. As an alternative, another type of two-beam interferometer can be used as the laser phase difference detecting device. Furthermore, in this embodiment, a Littrow reflector is used as the optical path length changing unit 7. For example, a space phase modulator can be alternatively used as the optical path length changing unit. In addition, the two-dimensional light detector 10 only has to detect the intensity of the interference light for each of the plurality of laser beams which construct the beam to be measured 1. Therefore, for example, a needed number of single photodiodes arranged can be alternatively used.

Embodiment 2

In embodiment 1, it is necessary to grasp variations in the optical path lengths with a high degree of precision when scanning the length of the optical path of the reference light using the optical path length changing unit 7 in order to detect the phase difference among the phases of the individual laser beams which construct the beam to be measured 1. However, there is a possibility that the lengths of the two optical paths extending from the beam splitter 2 to the beam splitter 3 vary with time under the influence of change in the ambient temperature and vibrations. Therefore, in accordance with embodiment 2, a means for correcting for variations in the optical path lengths is provided.

Figure 2:
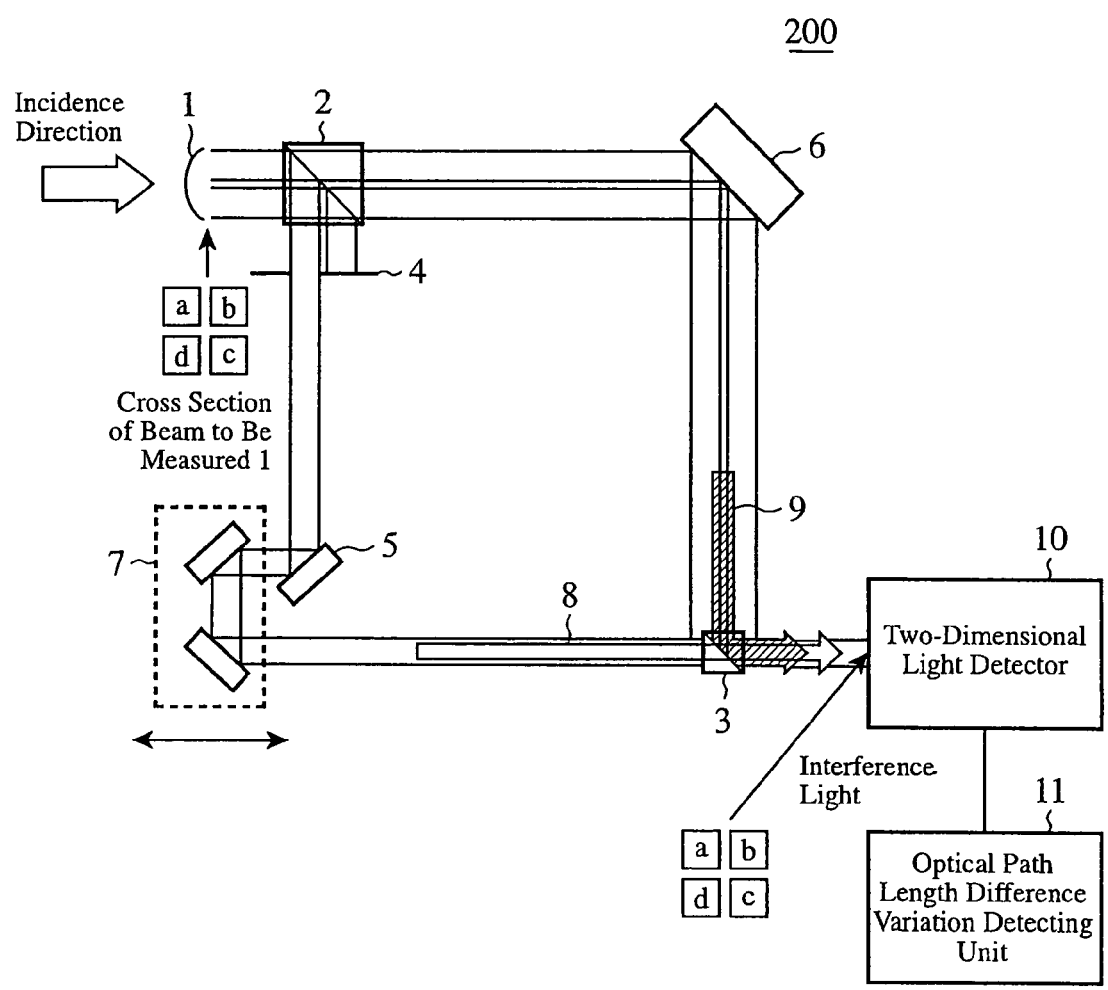
FIG. 2 is a diagram showing the structure of a laser phase difference detecting device in accordance with embodiment 2 of the present invention.

FIG. 2 is a block diagram showing the structure of a laser phase difference detecting device 200 according to embodiment 2. The same reference numerals as shown FIG. 1 denote the same components. As shown in the figure, the laser phase difference detecting device 200 is provided with an optical path length difference variation detecting unit 11.

Next, the operation of the laser phase difference detecting device in accordance with this embodiment of the present invention will be explained.

The optical path length difference variation detecting unit 11 measures the intensity of interference light resulting from interference between reference light 8 and a part of light to be measured 9 which corresponds to a beam a in order to detect measurement errors due to variations in the lengths of the optical paths extending from the beam splitter 2 to the beam splitter 3.

Because the reference light 8 is a part of the beam a which is selectively extracted from one of two beams into which the beam to be measured 1 is split by the beam splitter 2, the intensity of the interference light resulting from the interference between the reference light 8 and the part of the light to be measured 9 which corresponds to the beam a reflects only the difference between the lengths of the two optical paths extending from the beam splitter 2 to the beam splitter 3. Therefore, the variations in the lengths of the two optical paths extending from the beam splitter 2 to the beam splitter 3 can be known correctly on the basis of the intensity of the interference light resulting from the interference between the reference light 8 and the part of the light to be measured 9 which corresponds to the beam a.

The variations in the lengths of the two optical paths can be corrected for by performing signal processing on the output signal of the two-dimensional light detector 10 on the basis of the variation in the difference between the optical path length of the reference light 8 and the optical path length of the light to be measured 9 within the interferometer, which is detected by the optical path length difference variation detecting unit 11.

As mentioned above, in accordance with embodiment 2, the laser phase difference detecting device detects the variation in the difference between the optical path lengths of the reference light 8 and light to be measured 9 which travel from the beam splitter 2 to the beam splitter 3 using the optical path length difference variation detecting unit 11, and corrects for the variation in the difference between the optical path lengths by performing signal processing on the output signal of the two-dimensional light detector 10. Therefore, the laser phase difference detecting device can eliminate the influence of the variation in the difference between the optical path lengths, and can increase the reliability and stability of the phase shift detection.

Instead of performing signal processing on the output signal so as to correct for the variation in the difference between the optical path lengths, the laser phase difference detecting device can feed the output signal of the optical path length difference variation detecting unit 11 back to either the optical path length changing unit 7 or an optical path length control means which is disposed separately from the optical path length changing unit 7 so as to cause it to correct for the variation in the difference between the optical path lengths.

Embodiment 3

In accordance with embodiment 1, the laser phase difference detecting device scans the optical path length of the reference light using the optical path length changing unit 7. However, when the beam to be measured 1 is a single shot pulse, the scanning method of embodiment 1 cannot be used because the optical path length cannot be scanned. A laser phase difference detecting device in accordance with embodiment 3 is an extension of that according to embodiment 1 so that it can support a single shot pulse.

Figure 3:
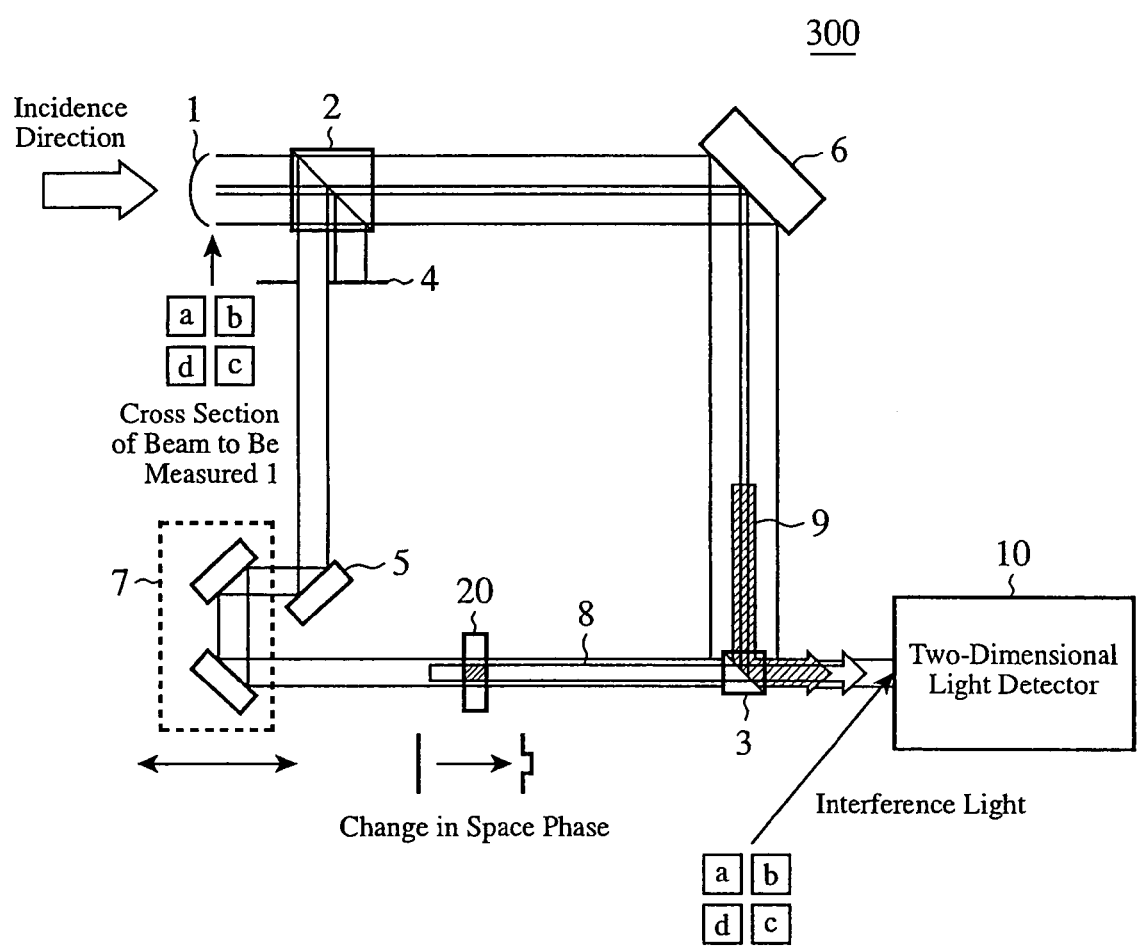
FIG. 3 is a diagram showing the structure of a laser phase difference detecting device in accordance with embodiment 3 of the present invention.

FIG. 3 is a block diagram showing the structure of the laser phase difference detecting device 300 according to embodiment 3. The same reference numerals as shown FIG. 1 denote the same components. As shown in the figure, the laser phase difference detecting device 300 is provided with a space phase difference providing unit 20. The space phase difference providing unit 20 operates so as to produce a phase difference in the cross section of the reference light 8, and is constructed of, for example, a flat glass in which a difference exists in the thickness thereof.

Next, the operation of the laser phase difference detecting device in accordance with this embodiment of the present invention will be explained.

In a case in which the amplitude a1 of the reference light 8 and the amplitude a2 of the light to be measured 9 are known, it is possible to determine the phase difference $(\theta 1-\theta 2)$ between their phases using the equation (1). Therefore, the laser phase difference detecting device can estimate the phase difference from the intensity of the interference light which it has measured through one-time reception of a pulse without scanning the optical path length of the reference light using the optical path length changing unit 7. However, because the intensity of the interference light varies sinusoidally with respect to the phase difference $(\theta 1-\theta 2)$, two solutions exist in the phase difference $(\theta 1-\theta 2)$ which provides an arbitrary interference light intensity, and therefore only one solution cannot be specified.

The provision of the space phase difference providing unit 20 produces a phase difference in the cross section of the reference light 8. When the optical path length difference which occurs in the cross section of the reference light 8 is set as $\Delta\theta 1$, the intensity of interference light given by the following equation (2), as well as the interference light intensity given by the equation (1), can be observed simultaneously.

$$I = a1^2 + a2^2 + 2a1 \cdot a2 \cos(\theta 1 - \theta 2 + \Delta\theta 1) \quad (2)$$

Because only one solution exists in the phase difference ($\theta 1 - \theta 2$) which simultaneously satisfies the equations (1) and (2), the phase difference ($\theta 1 - \theta 2$) can be determined from the two interference light intensities if $\Delta\theta 1$ is known.

As mentioned above, even if the beam to be measured 1 is single pulse laser light, the relative phase difference between the phases of the reference light and light to be measured can be detected through one-time reception of the pulse.

The space phase difference providing unit 20 produces only one phase difference spatially, as mentioned above. As an alternative, the space phase difference providing unit can produce two or more different phase differences spatially.

In the equations (1) and equation (2), the amplitudes a1 and a2 can be measured in advance. Furthermore, a measurement means for splitting and measuring the light to be measured 9 can be disposed separately to simultaneously carry out the measurement at the same time when the phase shift detection is carried out.

Embodiment 4

A laser phase difference detecting device according to embodiment 4 improves the S/N ratio of the output of that of embodiment 1.

Figure 4:
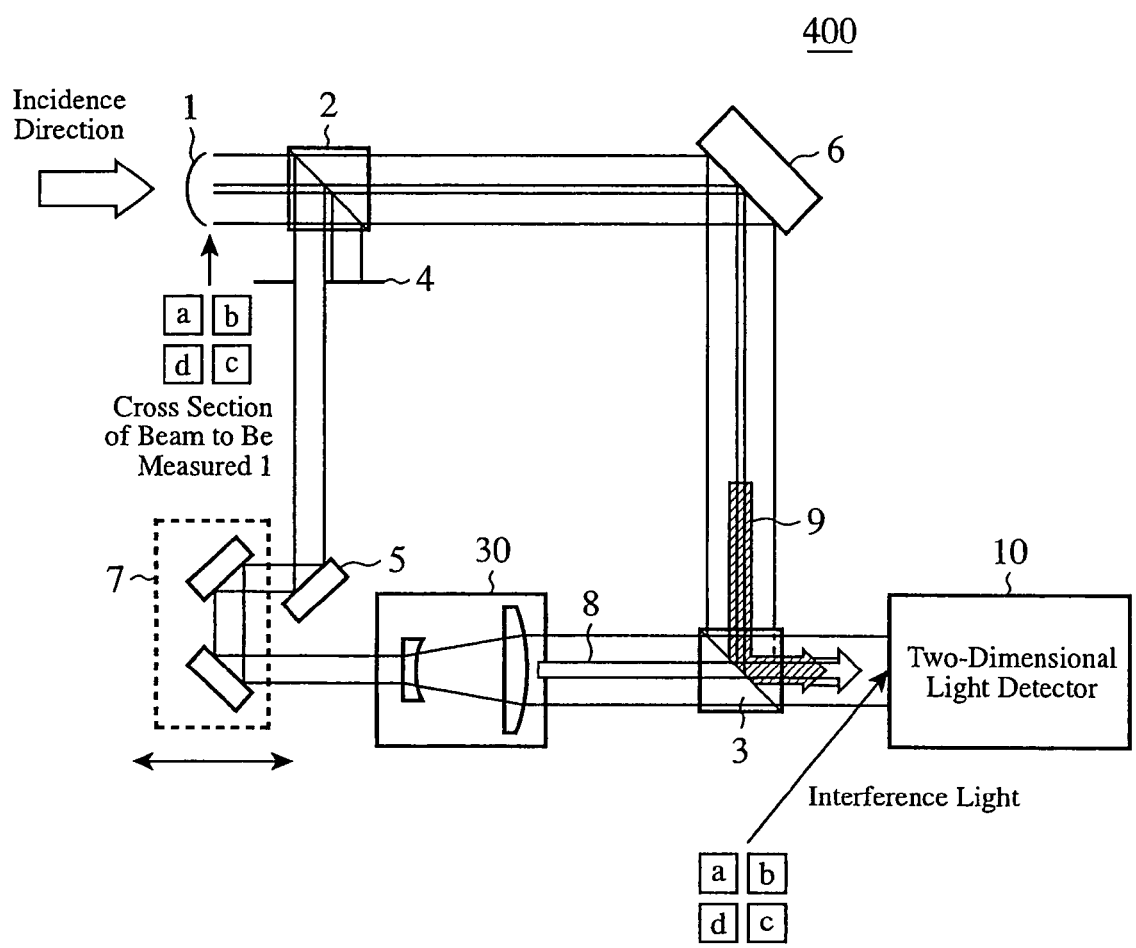
FIG. 4 is a diagram showing the structure of a laser phase difference detecting device in accordance with embodiment 4 of the present invention.

FIG. 4 is a block diagram showing the structure of the laser phase difference detecting device 400 according to embodiment 4. The same reference numerals as shown in FIG. 1 denote the same components. As shown in the figure, the laser phase difference detecting device 400 is provided with a beam diameter expanding unit 30. The beam diameter expanding unit 30 can expand the reference light 8 so that it has a diameter equal to that of the light to be measured 9. For example, a Galileo telescope can be used as the beam diameter expanding unit.

Next, the operation of the laser phase difference detecting device in accordance with this embodiment of the present invention will be explained.

In embodiment 4, the beam diameter expanding unit 30 makes the beam diameter of the reference light 8 be equal to that of the light to be measured 9. For this reason, the percentage of the light to be measured 9 which contributes to the interference light increases, and the utilization efficiency of the light can be improved. Therefore, the intensity of the beam to be measured 1 can be reduced.

Furthermore, in a case in which the beam diameter expanding unit 30 is made to also have a spatial filter function, the reference light 8 can be formed into a high-precision plane wave. As a result, not only the phase difference among the phases of the beams a, b, c, and d which construct the beam to be measured 1 but also a phase distribution in the cross section of the beam can be detected from the interference light intensity.

In this embodiment 4, the beam diameter expanding unit 30 is disposed on the optical path of the reference light 8. As an alternative, a beam diameter reducing unit can be disposed on the optical path of the light to be measured 9, and can reduce the beam diameter of the light to be measured 9 so that the beam diameter of the light to be measured 9 becomes equal to that of the reference light 8. In this case, the same advantage is provided.

Embodiment 5

A laser phase difference detecting device according to embodiment 5 improves the S/N ratio of the output of that of embodiment 1.

Figure 5:
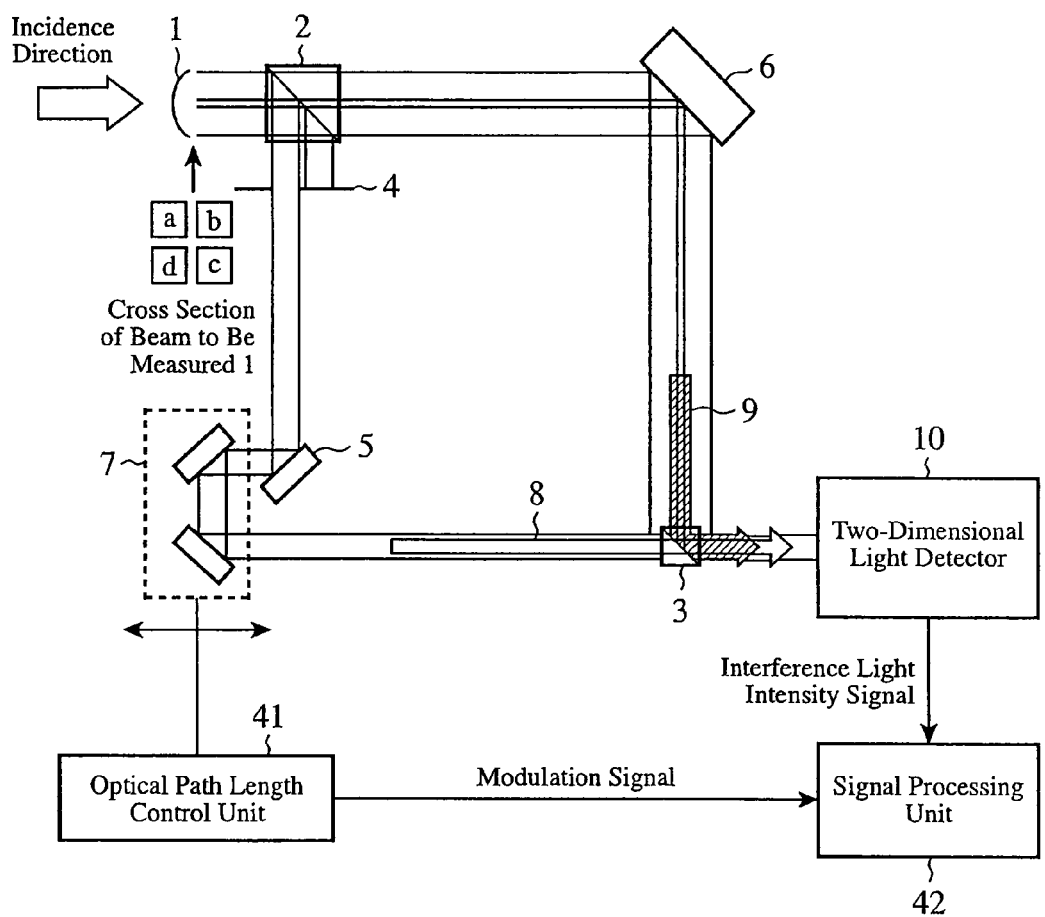
FIG. 5 is a diagram showing the structure of a laser phase difference detecting device in accordance with embodiment 5 of the present invention.

FIG. 5 is a block diagram showing the structure of the laser phase difference detecting device 500 according to embodiment 5. The same reference numerals as shown in FIG. 1 denote the same components. As shown in the figure, the laser phase difference detecting device 500 is provided with an optical path length control unit 41 and a signal processing unit 42.

Next, the operation of the laser phase difference detecting device in accordance with this embodiment of the present invention will be explained.

The laser phase difference detecting device 500 modulates the optical path length of the reference light 8 with a constant frequency and a constant amplitude by driving the optical path length changing unit 7 using the optical path length control unit 41. The laser phase difference detecting device implements the modulation using, for example, an oscillation generating element which consists of a voice coil. The signal processing unit 42 stores a time series variation in a signal indicating the interference light intensity which is the output of the two-dimensional light detector 10, and performs a Fourier transform on the variation.

As shown in the equation (1), the interference light intensity I varies sinusoidally depending on the phase difference ($\theta 1 - \theta 2$). Therefore, when the optical path length of the reference light 8 is modulated by the optical path length control unit 41, the amplitude $\Delta I$ of the interference light intensity I also varies almost sinusoidally depending on the phase difference ($\theta 1 - \theta 2$), and has the following relation.

$$(\theta 1 - \theta 2) = 0 \rightarrow \Delta I \text{ is minimized} \quad (3)$$

$$(\theta 1 - \theta 2) = pi/2, -pi/2 \rightarrow \Delta I \text{ is maximized} \quad (4)$$

That is, when the amplitude $\Delta I$ of the interference light intensity I is acquired, the phase difference ($\theta 1 - \theta 2$) can be known. The amplitude $\Delta I$ of the interference light intensity I can be acquired from the Fourier transformation result which is the output of signal processing unit 42 by extracting a power spectrum of the modulation frequency. However, whether the phase difference ($\theta 1 - \theta 2$) is positive or negative cannot be determined from the power spectrum. Therefore, for example, a modulation signal is extracted from the optical path length control unit 41, and lock-in detection is performed on the waveform of the interference light intensity in order to determine whether the phase difference is positive or negative.

As mentioned above, the laser phase difference detecting device in accordance with embodiment 5 can be insensitive to noise by detecting only the modulation frequency of the interference light intensity, and can detect the phase difference with a high degree of precision.

Embodiment 6

In accordance with embodiment 6, there is provided a laser phase control device which uses a laser phase difference detecting device according to either of embodiments 1 to 5.

Figure 6:
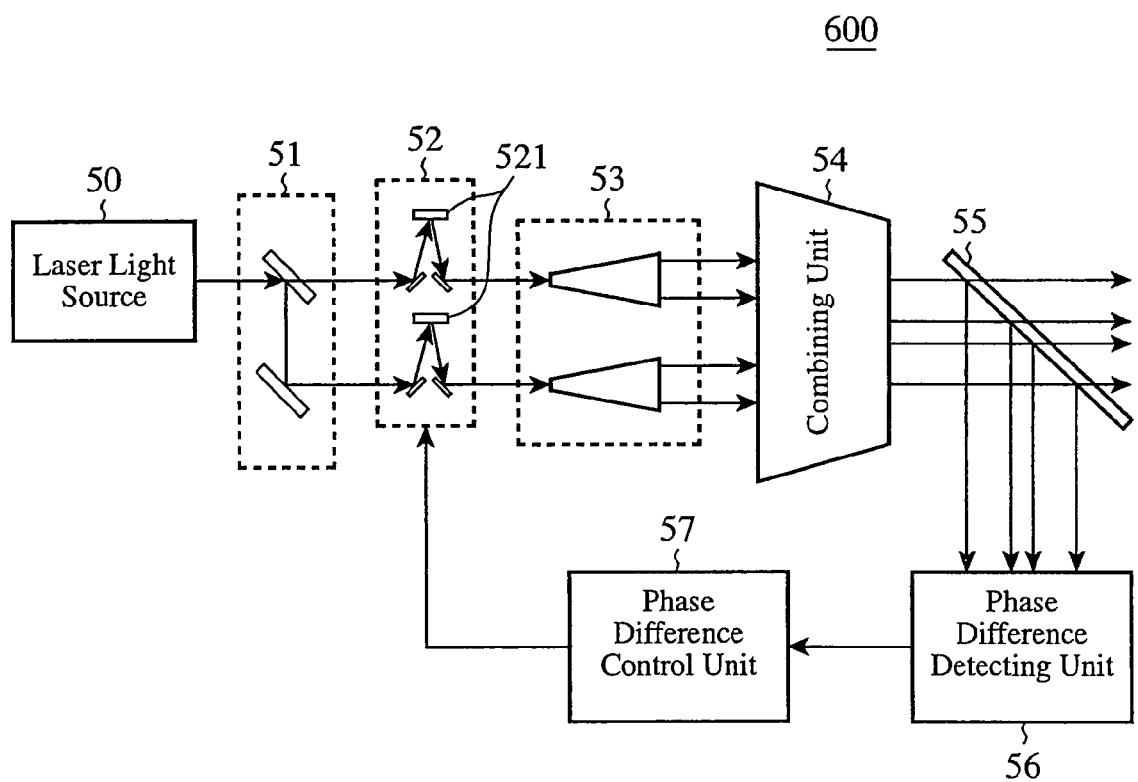
FIG. 6 is a diagram showing the structure of a laser phase control device in accordance with embodiment 6 of the present invention.

FIG. 6 is a diagram showing the structure of the laser phase control device 600 according to embodiment 6.

As shown in the diagram, the laser phase control device 600 is provided with a laser light source 50, a splitting unit 51, a phase delay changing unit (phase delay changing unit) 52, an amplifying unit 53, a combining unit 54, a laser beam extraction unit 55, a phase difference detecting unit (phase difference detecting unit) 56, and the phase difference control unit (phase difference control unit) 57.

Next, the operation of the laser phase control device in accordance with this embodiment of the present invention will be explained.

A laser beam emitted out of the laser light source 50 is split into two or more laser beams which are coherent to one another by the splitting unit 51. The splitting unit 51 consists of two or more beam splitters. The phase delay changing unit 52 changes a relative phase difference among the phases of the laser beams which should be coherent-coupled. The method of changing the relative phase difference is implemented by changing the position of the mirror 521. The amplifying unit 53 amplifies the intensities of the two or more laser beams outputted from the splitting unit 51, the relative phase difference among the phases of the laser beams being changed by the phase delay changing unit 52, and also expands the beam system if needed and outputs them. The combining unit 54 consists of mirrors and so on, and converts the spatial arrangement and angle of each of the laser beams output from the amplifying unit 53 so that the laser beams are coherent-coupled. The laser beam extraction unit 55 consists of a beam splitter and so on, and extracts a part of the two or more laser beams outputted from the combining unit 54 in order to furnish it to the phase difference detecting unit 56.

The phase difference detecting unit 56 is a laser phase difference detecting device according to either of embodiments 1 to 5, and detects and outputs a phase difference among the phases of the two or more laser beams, as a beam to be measured 1, extracted by the laser beam extraction unit 55.

The phase difference control unit 57 computes the difference between the relative phase difference between the phases of the two or more laser beams which is detected by the phase difference detecting unit 56, and a relative phase difference which is prestored according to the use to which this laser phase difference control device is put, computes a difference between a relative error in the two or more laser beams and the relative phase difference which is prestored according to the use to which this laser phase difference control device is put, computes a relative phase difference correction amount which makes the relative phase difference between the phases of the two or more laser beams be a desired value from this difference, and outputs a feedback control signal to the phase delay changing unit 52.

As mentioned above, in accordance with embodiment 6, because a laser phase difference detecting device according to either of embodiments 1 to 5 is used as the phase difference detecting unit 56, this embodiment offers the same advantage as provided by either of embodiments 1 to 5, and also provides an advantage of being able to keep the relative phase difference between the phases of the two or more laser beams which should be coherent-coupled in a predetermined state.

INDUSTRIAL APPLICABILITY

As mentioned above, the laser phase difference detecting device in accordance with the present invention is suitable for uses, as an optical measuring technique and an optical control technique, for apparatus in general which controls and treats two or more laser beams which are coherent to one another.

The invention claimed is:

1. A laser phase difference detecting device comprising:
an optical path splitting unit for splitting a laser beam group including a plurality of individual laser beams into a first laser beam group which travels along a first optical path and a second laser beam group which travels along a second optical path;
a beam selection/extraction unit for selecting, as reference light, one laser beam from said first laser beam group so as to allow the selected laser beam to pass therethrough;
an optical path length changing unit for changing an optical path length of said first optical path;
an optical path combining unit for combining said first optical path and said second optical path such that said reference light and said second laser beam group are combined, producing interference light; and
a light detector for detecting an intensity of said interference light,
wherein said laser phase difference detecting device changes the optical path length of said first optical path using said optical path length changing unit so as to detect an optical path length which maximizes the intensity of said interference light for each of the laser beams in said second laser beam group, and determines a phase difference among the individual laser beams on a basis of the detected optical path length, and
wherein the intensity of said interference light is related to the amplitude of said reference light, the amplitude of said laser beam to be measured, and a measured phase difference between said reference light and said laser beam to be measured.

2. The laser phase difference detecting device according to claim 1, wherein said device includes an optical path length difference variation detecting unit for calculating a variation in an optical path length difference between a length of the first optical path and that of the second optical path on a basis of an intensity of interference light resulting from interference between a laser beam corresponding to the reference light among the laser beams constituting the second laser beam group, and the reference light, and said device corrects for the variation in said optical path length difference by processing an output signal of the light detector on a basis of said calculated variation.

3. The laser phase difference detecting device according to claim 2, wherein said device corrects for the optical path length difference by driving the optical path length changing unit on a basis of the variation in the optical path length difference which are calculated by the optical path length difference variation detecting unit.

4. The laser phase difference detecting device according to claim 1, wherein said device includes a space phase difference providing unit disposed on the first optical path, for producing a phase difference in a cross section of the reference light passing therethrough.

5. The laser phase difference detecting device according to claim 1, wherein said device includes either a beam diameter expanding unit disposed on the first optical path, for expanding a diameter of the reference light so as to make it equal to a diameter of the second laser beam group, or a beam diameter reducing unit disposed on the second optical path, for reducing the diameter of the second laser beam group so as to make it equal to the diameter of the reference light.

6. The laser phase difference detecting device according to claim 1, wherein said device includes a signal processing unit for Fourier-transforming a time-series variation in the intensity of the interference light detected by the light detector, and an optical path length control unit for driving the optical path length changing unit so that the optical path length of the first optical path varies with very small amplitude at a certain frequency.

7. A laser phase control device comprising:

a laser light source;

a splitting unit for splitting a laser beam outputted from said laser light source into a plurality of laser beams;

an amplifying unit for amplifying intensities of the plurality of laser beams generated by said splitting unit, respectively;

a combining unit for coherent-coupling the plurality of beams amplified by said amplifying unit;

a phase delay changing unit for controlling phases of the laser beams generated by said splitting unit;

a phase difference detecting unit for detecting a phase difference among the plurality of laser beams amplified by said amplifying unit; and a phase difference control unit for arbitrarily controlling a spatial intensity distribution of the laser beams coherent-coupled by said combining unit on a basis of the phase difference among the plurality of laser beams, which is detected by said phase difference detecting unit, wherein said phase difference detecting unit is the laser phase difference detecting device according to claim 1.

8. The laser phase difference detecting device according to claim 1, wherein said laser phase difference detecting device changes the optical path length of said first optical path using said optical path length changing unit so as to detect an optical path length which maximizes the intensity of said interference light for each of the laser beams constituting said second laser beam group, and determines a phase difference among the individual laser beams on a basis of the detected optical path length, based on $I = a1^2 + a2^2 + 2a1 \cdot a2 \cos(\theta1 - \theta2)$, where I is the intensity of the interference light, a1 is the amplitude of the reference light, a2 is the amplitude of the laser beam to be measured, $\theta1$ is the phase of the reference light, and $\theta2$ is the phase of the laser beam to be measured.

* * * * *